United States Patent [19]
Vore

[11] 3,815,926

[45] June 11, 1974

[54] LOW FRICTION SEALING MEANS

[75] Inventor: Herbert G. Vore, Nashua, N.H.

[73] Assignee: Improved Machinery Inc., Nashua, N.H.

[22] Filed: May 14, 1973

[21] Appl. No.: 360,298

Related U.S. Application Data

[63] Continuation of Ser. No. 137,873, April 27, 1971, abandoned.

[52] U.S. Cl................................. 277/34, 277/75
[51] Int. Cl........................... F16j 9/00, F16j 15/46
[58] Field of Search ............ 277/34, 34.3, 34.6, 75

[56] References Cited
UNITED STATES PATENTS

| | | | |
|---|---|---|---|
| 2,310,309 | 2/1943 | Orr................................ | 277/34 X |
| 2,699,580 | 1/1955 | Smith............................... | 49/477 |
| 2,894,635 | 7/1959 | Irthum et al...................... | 277/34.3 UX |
| 3,007,518 | 11/1961 | Simpson.......................... | 277/34 X |
| 3,178,779 | 4/1965 | Clark et al....................... | 277/34 X |
| 3,212,408 | 10/1965 | Randol............................ | 277/34 X |
| 3,578,342 | 5/1971 | Satterthwaite................... | 277/34 X |

Primary Examiner—Samuel B. Rothberg
Attorney, Agent, or Firm—Robert R. Paquin

[57] ABSTRACT

Sealing means comprising a hollow seal containing a chamber and having a wall including a plurality of openings which are either formed completely through the wall thickness or only partially through the wall thickness in communication with one or more grooves in the outer face of the wall. In operation, pressurized fluid at a pressure greater than that of the fluid being sealed is normally continuously supplied to the seal chamber whereby the supplied fluid flows through the openings and intermediate the wall outer face and a thereadjacent element.

17 Claims, 8 Drawing Figures

PATENTED JUN 11 1974 3,815,926

INVENTOR
HERBERT G. VORE
BY
Robert R. Paquin
ATTORNEY

LOW FRICTION SEALING MEANS

This is a continuation of United States Patent Application Ser. No. 137,873, Filed Apt. 27, 1971 now abandoned.

The present invention relates to the provision of new and improved low friction sealing means.

Conventional sealing means, when employed for sealing along movable elements, generally inherently exert an undesirably large frictional force or drag on the movable elements, thereby causing increased power consumption and wear. Also, conventional sealing means, whether employed with static or moving elements, normally are not readily adjustable to accommodate lateral movement of the elements and/or differential expansion, and usually are unable to maintain differential pressures on the elements.

An object of the present invention is to provide new and improved sealing means particularly constructed and arranged to exert only minimal frictional force on a movable element.

Another object of the invention is to provide new and improved sealing means particularly constructed and arranged to maintain differential pressures on an element.

Another object is to provide new and improved sealing means particularly constructed and arranged to be automatically adjustable to accommodate differential expansion and limited lateral movement of an element.

Another object is to provide new and improved sealing means particularly constructed and arranged to be self-cleaning during operation.

Other objects and advantages of the invention will be apparent from the following description taken in connection with the accompanying drawings.

In accordance with the invention, a space between a plurality of elements at an end exposed to fluid at a first pressure may be sealed by sealing means comprising a seal defining a chamber and including a wall having a face remote from said chamber opposing one of said elements, said wall, during the sealing, including portions adjacent opposite sides of the seal closer to said one of said elements than any therebetween part of said wall and intermediate said wall portions including a groove extending inwardly from said face through only a portion of the thickness of said wall, said wall also including a plurality of openings extending only partially through the thickness of said wall communicating said groove with said chamber, said face, during the sealing, intermediate said wall portions defining a single concave arc to provide only a single cavity between said face and said one of said elements, and means for supplying fluid at a second pressure, higher than said first pressure, to said chamber whereby the fluid flows from said chamber through said openings and said groove to said cavity without deflecting said face from such concave configuration.

Referring to the drawings.

Figure 1:
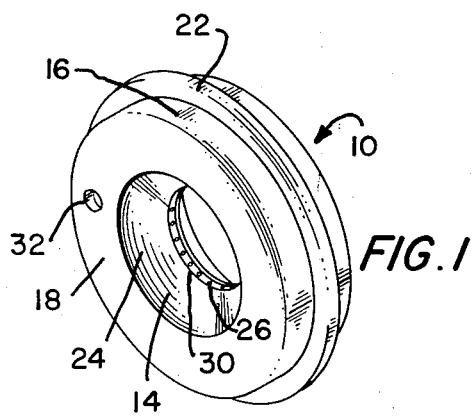
FIG. 1 is a view in perspective of one form of sealing means embodying the invention.
Figures 2, 4:
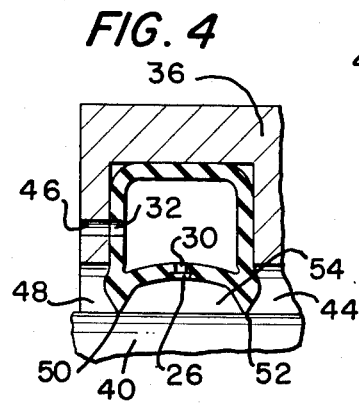
FIG. 2 is an enlarged, fragmentary, sectional view of the sealing means shown in FIG. 1.
FIGS. 4 through 8 are sectional views illustrating other forms of sealing means constructed in accordance with alternative embodiments of the invention.
Figure 3:
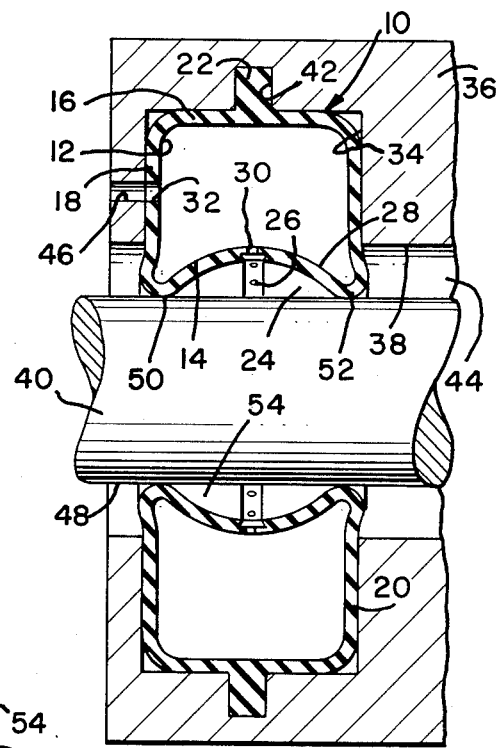
FIG. 3 is a further enlarged sectional view illustrating the sealing means of FIGS. 1 and 2 during its sealing of a space between a carrier element and another element.

Referring more particularly to the drawings wherein similar reference characters designate corresponding parts throughout the several views, as shown in FIGS. 1 through 3, the sealing means comprises a hollow annular seal, designated generally as 10, which contains a constant cross-section annular chamber 12. The chamber 12 is bounded along its inner and outer circumferences by the circumferential inner and outer walls 14, 16 of the seal 10 and along its opposite sides is defined by the seal side walls 18, 20 integrally formed with the walls 14, 16. The outer wall 16 is provided with an integral, outwardly extending, annular mounting flange 22 employed to mount the seal in its operating position; and at least one of the side walls 18, 20 includes one or more openings 32 through its thickness for purposes to be hereinafter described.

The inner wall 14 includes a constant cross-section annular groove 26 which is formed from its inner circumferential face 24 through only a portion of the thickness of the wall 14; and the wall 14 also includes a plurality of openings 30 formed from its circumferentially outer or other face 28 through only a portion of its thickness to communicate the chamber 12 with the groove 26. As illustrated, the groove 26 is formed generally centrally of the inner wall 14; and the openings 30 are of substantially smaller cross-section than the groove 26 and located equally spaced arcuately along the latter. The inner wall 14 is constructed such that its faces 24, 28 are, respectively, formed of the generally convex and generally concave configuration shown in FIG. 2. However, the seal 10, or at least the inner wall 14, is constructed of a material such as, for example, rubber, plastic, or fabric, sufficiently flexible to permit the inner wall 14 to be deflected by force applied to the wall face 24 to the reverse configuration illustrated in FIG. 3.

As shown in FIG. 3, the seal 10 is mounted in an annular recess 34 contained within an annular element 36 spaced by an annular space 28 from a second element 40 which may be axially movable or rotatable relative to the element 36. The mounting flange 22 on the outer wall 16 is fixedly received in an annular groove 42 in the element 36. The opening 32 in the side wall 18 is aligned with a bore 46 in the element 36, in turn, communicating with a pressurized source of a fluid which preferably is water or another lubricating liquid; and the chamber 12 in the seal 10 is, as will be understood, filled with fluid from such source. The space 38 between the elements 36, 40 at its end 44 is exposed to the pressurized fluid to be prevented from flowing through the space 38; the other end 48 of the space 38 may be, for example, exposed to atmospheric pressure. The pressurized source of fluid connected to the bore 46 is adapted to continuously supply a small quantity of the pressurized fluid throughout the operation of the seal 20; and the pressure of the supplied pressurized fluid is predetermined to be slightly higher than that of the fluid to which the end 44 of the space 38 is exposed. By way of example, in the event that the space end 44 were exposed to pressurized fluid at 10 psi, the fluid supplied through the bore 46 could be at 15 psi.

The inner wall 14 of the seal 10, as aforementioned, is deflected towards the chamber 12 such that, intermediate annular portions 50, 52 adjacent opposite sides of the wall 14 which are closely spaced from the element 40, the faces 24, 28 are formed of generally concave and convex configuration, respectively. This deflection is automatically accomplished by external force applied by the element 40 to the inner face 14 due to the provision of the groove 26 and results in the formation of an annular cavity 54 which is bounded along its inner and outer peripheries by the element 40 and the face 24 of the wall 14 and adjacent its sides defined by the annular portions 50, 52 of the seal 20.

During the operation of the seal 10, the chamber 12 is filled with pressurized fluid supplied through the bore 46 and opening 32 at a pressure slightly higher than the pressure of the fluid to which the end 44 of the space 38 is exposed; and additional or make-up pressurized fluid is continuously supplied to the chamber 12 through the bore 46 and the opening 32. Pressurized fluid from the chamber 12 flows through the openings 30 and groove 26 to the cavity 54 and then intermediate the seal portions 50, 52 whereby the seal 20 and the forces against the element 40 generated by the inflation of the seal 20 are entirely fluid floated on the element 40. Hence, the pressurized fluid flowing from the chamber 12 automatically flushes away any foreign matter which might otherwise enter between the seal 20 and the element 40 to thereby make the seal self-cleaning; and, by variation of the pressure of the fluid supplied to the chamber 12, differential pressures may be readily maintained on the element 40. Also, as will be seen, differential expansion and limited lateral movement of the element 40 do not interfere with the seal operation and only minimal frictional force is exerted by the seal on the element 40.

Moreover, even in the event that the continuous supply of additional or make-up pressurized fluid to the chamber 12 is interrupted, the seal 20 is capable of extended successful operation as only a minor volume of liquid can flow to the cavity 54 through the narrow space between the seal portion 52 and the element 40.

Figure 7:
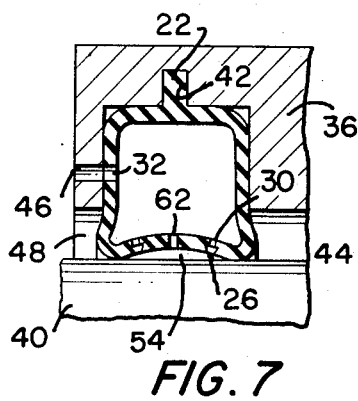
Figure 6:
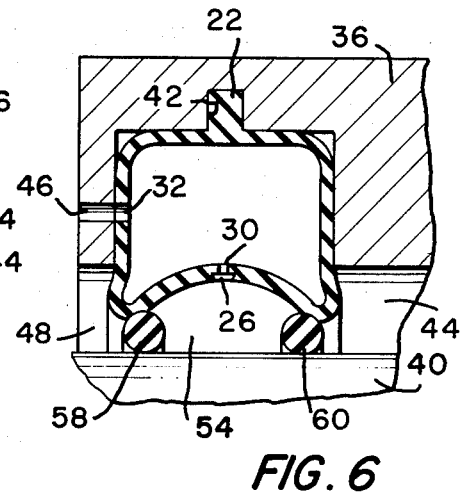
Figure 5:
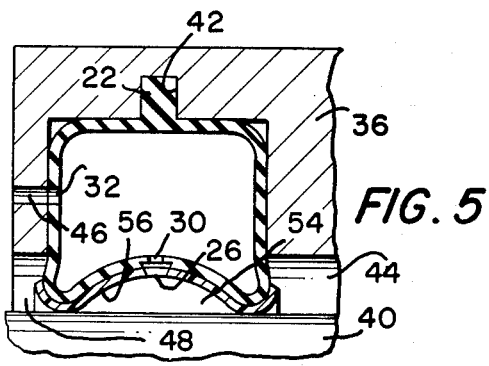

FIGS. 4 through 8 illustrate sealing means constructed in accordance with slightly modified embodiments of the invention. As shown in FIG. 4, the portions 50, 52 of the seal 10 may be constructed of pointed configuration to form the clearances between them and the element 40 of minimal dimension. As shown in FIG. 5, the face 24 of the wall 14 of the seal 10 may be provided with a coating 56 of low-coefficient of friction material such as, for example, ploytetrafluoroethylene or TFE. Further alternatively, as shown in FIG. 6, the face 24 may, adjacent the portions 50, 52 of the seal 10, be spaced from the element 40 by rings 58, 60 which may themselves be filled with, or provided with external coverings of, low-coefficient of friction material. Also, as illustrated in FIG. 7, the face 24 may be provided with a plurality of the grooves 26 and their communicating openings 30, each one of the grooves 26 being located on opposite sides of the center of the wall 14 and the latter including openings completely comply through the thickness of the wall 14 at locations spaced arcuately therearound.

Figure 8:
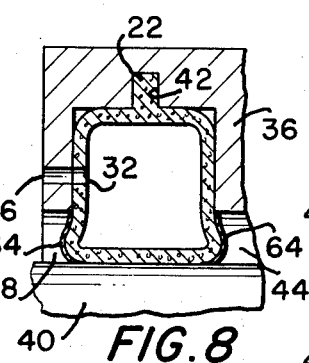

Further alternatively, as illustrated in FIG. 8, the wall 14 of the seal 10 may be constructed of porous configuration, thereby providing the wall with a plurality of openings completely through the thickness of the wall 14 throughout its cross-section. In the event that the entire seal 10 is formed of the porous material, suitable protective coatings or coverings 64 of non-porous material may be provided for preventing leakage from the chamber 12 through the sides of the seal 10.

Moreover, although the seal 10 and its contained chamber 12 have been illustrated and hereinbefore described as being of annular configuration, it will be understood that they could alternatively be of other suitable shape such as, for example, an arcuate length less than three-hundred-and-sixty degrees. Also, if desired, a plurality of seals constructed in accordance with the invention could be positioned in juxtaposed or side-by-side relationship.

From the aforegoing description it will be seen that the invention provides new and improved means for accomplishing all of the aforestated objects and advantages. It will be understood, however, that, although only a few embodiments of the invention have been illustrated and hereinbefore specifically described, the invention is not limited merely to these embodiments but rather contemplates other embodiments and variations within the scope of the following claims.

Having thus described my invention, I claim:

1. In combination with a plurality of elements spaced by a therebetween space which at an end is exposed to fluid at a first pressure, sealing means for preventing flow of such fluid through said space, said sealing means comprising a seal defining a chamber and including a wall having a face remote from said chamber opposing one of said elements, said wall, when the sealing means is preventing such fluid flow, including portions adjacent opposite sides of the seal closer to said one of said elements than any therebetween part of said wall and intermediate said wall portions including a groove extending inwardly from said face through only a portion of the thickness of said wall, said wall also including a plurality of openings extending only partially through the thickness of said wall communicating said groove with said chamber, said face, when the sealing means is preventing such fluid flow, intermediate said wall portions defining a single concave arc to provide only a single cavity between said face and said one of said elements, and means for supplying fluid at a second pressure, higher than said first pressure, to said chamber whereby the fluid flows from said chamber through said openings and said groove to said cavity without deflecting said face from said concave configuration.

2. The combination of claim 1, wherein said wall is flexible, and said face is deflected to define said concave arc.

3. The combination of claim 1, wherein said fluid supplying means comprises means for continuously supplying fluid to said chamber during the normal operation of said sealing means.

4. The combination of claim 1, wherein said face is provided with low-coefficient of friction material.

5. The combination of claim 1, further comprising ring means intermediate said wall and said one of said elements adjacent said wall portions.

6. The combination of claim 1, wherein said wall includes a plurality of said grooves and a plurality of said openings in communication with each of said grooves.

7. The combination of claim 6, wherein said grooves are laterally spaced apart.

8. The combination of claim 7, wherein said wall includes at least one opening extending completely through its thickness intermediate said laterally spaced apart grooves.

9. The combination of claim 1, wherein said chamber is completely contained within said seal, and said fluid supplying means comprises an opening through a side wall of said seal.

10. The combination of claim 1, wherein said seal is hollow and contains said chamber, said wall is flexible, said portions of said wall are closely spaced from said one of said elements when the sealing means is preventing said fluid flow, and said face is deflected to define said concave arc.

11. The combination of claim 10, wherein said fluid supplying means comprises means for continuously supplying fluid to said chamber during the normal operation of said sealing means.

12. The combination of claim 10, wherein said fluid supplying means comprises an opening through a side wall of said seal.

13. The combination of claim 10, wherein said wall includes a plurality of said grooves and a plurality of said openings in communication with each of said grooves.

14. The combination of claim 13, wherein said grooves are laterally spaced apart.

15. The combination of claim 14, wherein said wall includes at least one opening extending completely through its thickness intermediate said laterally spaced apart grooves.

16. The combination of claim 10, wherein said face is provided with low-coefficient of friction material.

17. The combination of claim 10, wherein said groove is generally centrally of said wall.

* * * * *